Sept. 30, 1958 W. P. MURRAY 2,854,131
APPARATUS FOR DE-CLOGGING INTERSTICES OF SHEET-TYPE CONVEYORS
Filed Sept. 24, 1952 3 Sheets-Sheet 1

Inventor:
Walter P. Murray
by John H. McKenna
Attorney

Sept. 30, 1958 W. P. MURRAY 2,854,131
APPARATUS FOR DE-CLOGGING INTERSTICES OF SHEET-TYPE CONVEYORS
Filed Sept. 24, 1952 3 Sheets-Sheet 2
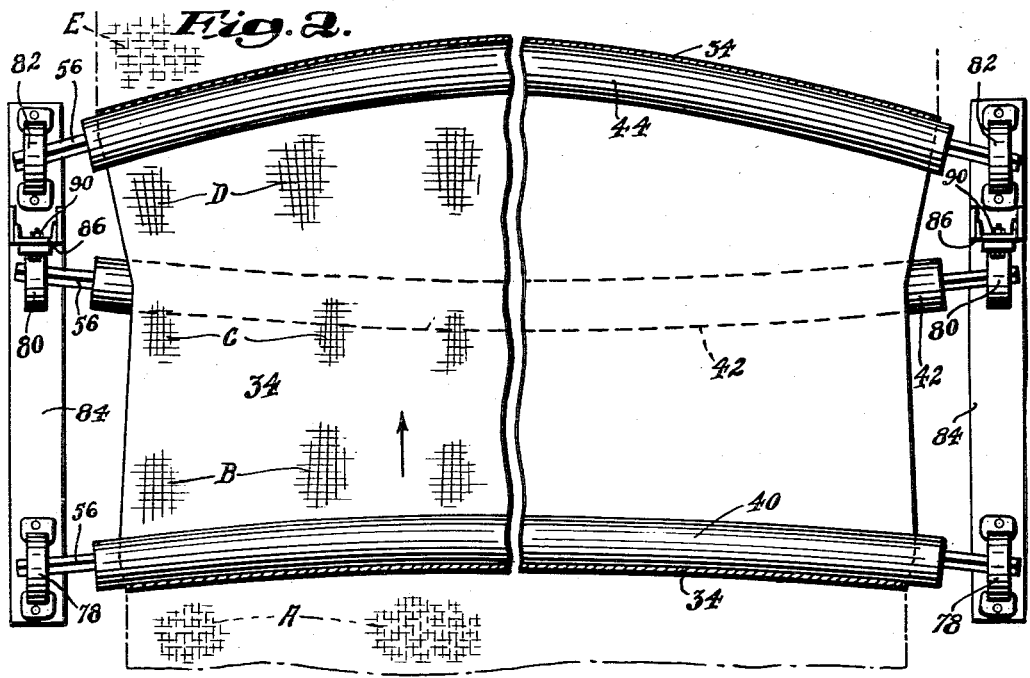
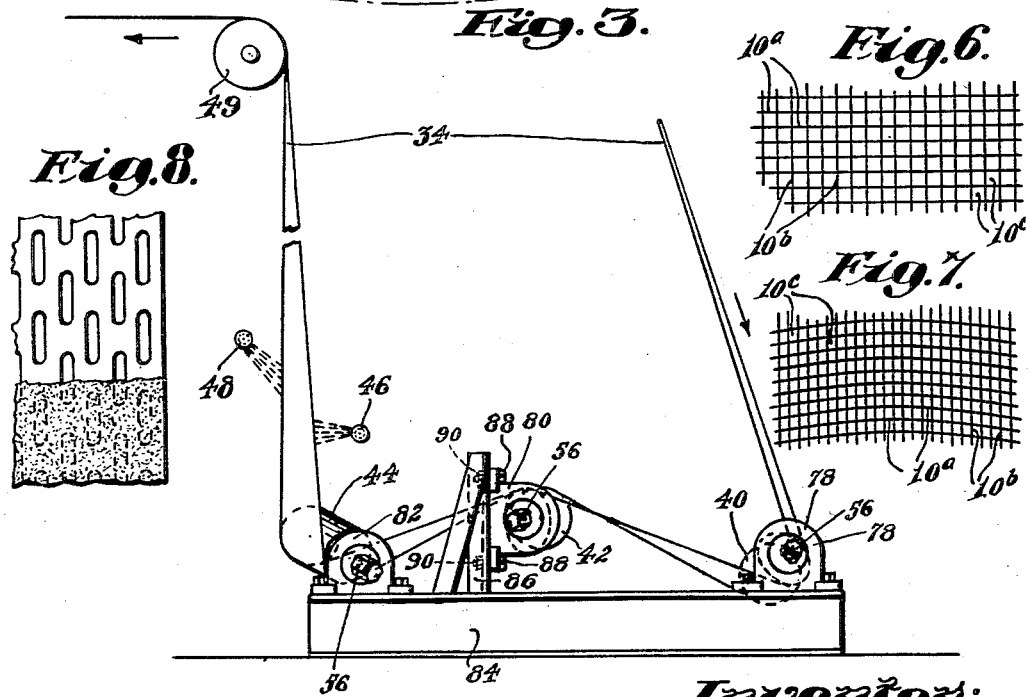
Inventor:
Walter P. Murray
by John H. McKenna
Attorney Sept. 30, 1958  W. P. MURRAY  2,854,131
APPARATUS FOR DE-CLOGGING INTERSTICES OF SHEET-TYPE CONVEYORS
Filed Sept. 24, 1952  3 Sheets-Sheet 3
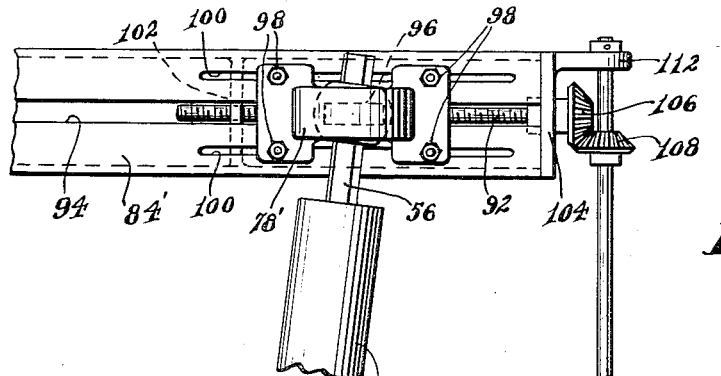
Fig. 9.
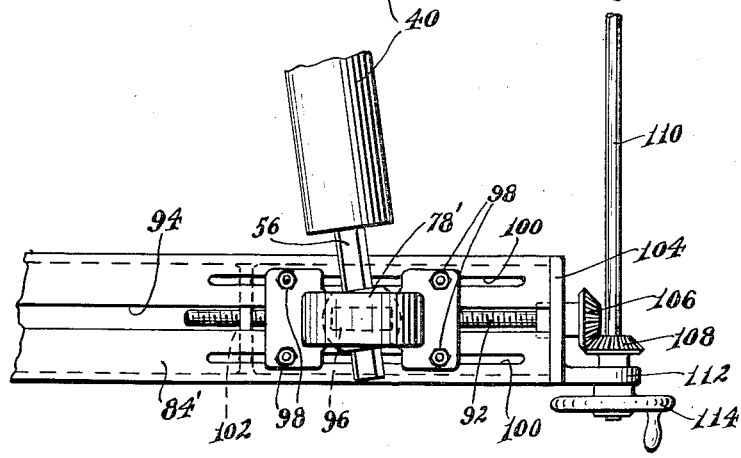
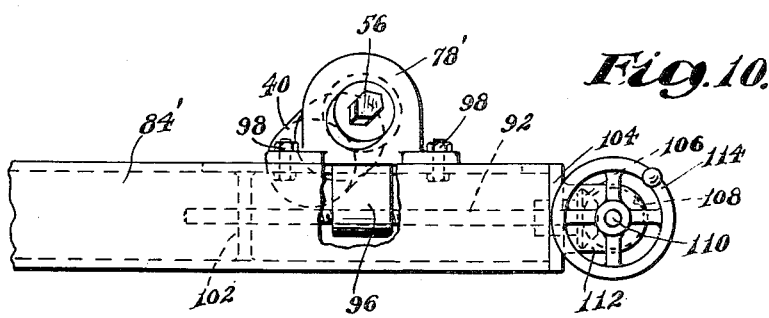
Fig. 10.
Inventor:
Walter P. Murray
by John H. McKenna
Attorney.

United States Patent Office 2,854,131
Patented Sept. 30, 1958

2,854,131

APPARATUS FOR DE-CLOGGING INTERSTICES OF SHEET-TYPE CONVEYORS

Walter P. Murray, Bridgewater, Mass., assignor, by mesne assignments, to Mount Hope Machinery Company, Taunton, Mass., a corporation of Massachusetts Application September 24, 1952, Serial No. 311,175

8 Claims. (Cl. 198—230)

This invention relates to apparatus for de-clogging interstices of sheet-type conveyors. More particularly it provides apparatus for gently dislodging foreign matter which may be clogging interstices of sheet conveyors so that the dislodged matter may be effectively washed from the conveyor as it travels from the dislodging apparatus through a spray region.

The invention has general application for increasing the efficiency and prolonging the efficient life of conveyors and more especially woven sheet conveyors which are required to carry materials and substances which tend to cling to the conveyor or to lodge in the interstices of the weave. It will be found to have a special utility in the paper making art where endless conveyors or "felts" support and convey the pulp or paper stock in a wet and plastic state, and where suction frequently must act through the felts on the paper stock at particular stages in the paper-making process. Masses and particles of the pulp or paper stock tend to accumulate on the "felts" and clog their interstices with resulting diminution of efficiency and interference with the intended and desired results.

Heretofore, such endless conveyor "felts" as employed in paper-making machines have been subjected to the action of water sprays for washing foreign matter from the "felts." Because the foreign matter, in large part, lodges in the interstices of the conveyors, the water sprays alone have proven inadequate to effectively clean the "felts." It has been necessary, prior to the present invention, to mechanically beat the "felts" to loosen and dislodge foreign matter to an extent which would enable the sprays to wash the foreign matter from the "felts." However, the prior "felt"-beating procedures have deleteriously affected the "felts" with a substantial reduction in their efficient lives. Also, the prior beating procedures have not succeeded in dislodging all foreign matter from the "felt" interstices and "felts" lose their initial softness and to a considerable degree their porosity.

It is among the objects of my present invention to provide an apparatus for gently acting on sheet conveyors, such as paper-making machine conveyor "felts," for example, to intermittently expand and contract the conveyor transversely of its direction of travel thereby to successively open and close and open its interstices thereby to effect a relatively gentle loosening and dislodging of foreign matter on the conveyor prior to passage of any portion of the conveyor thus acted upon into a wash region where the foreign matter becomes effectively washed from the conveyor.

Another object of the invention is to provide an apparatus wherein at least two curved axis rolls are arranged to act in succession on a travelling flexible sheet conveyor, and at least one of the rolls has its curved surface acting on the conveyor to expand the conveyor transversely of the direction of its travel and at least one other of the rolls has its curved surface acting on the conveyor to contract the conveyor transversely of the direction of its travel, the said successive changes in the transverse dimension of the conveyor effecting successive lateral openings and closings and openings of conveyor interstices with a resulting loosening and dislodging of foreign matter on the conveyor.

A further object of the invention is to provide an apparatus wherein a plurality of curved axis rolls act on a travelling woven conveyor to prevent bowing of the weft or filler elements of the woven conveyor while intermittently expanding and contracting the conveyor transversely of the direction of its travel with a resulting opening and closing of the interstices of the weave for dislodging foreign matter which may be clogging the interstices.

Yet another object of the invention is to provide an apparatus having a plurality of curved axis rolls acting on a travelling woven conveyor to successively expand and contract or to contract and expand the conveyor transversely of the direction of its travel, and having one of the curved axis rolls bodily adjustable on its support whereby it can serve as a take-up roll for subjecting the travelling conveyor to a desired amount of tension.

It is, moreover, my purpose and object generally to improve apparatus and procedures for maintaining woven conveyors free of accumulations of foreign matter.

In the accompanying drawings:

Fig. 2 is a top plan view on a larger scale, of that curved roll apparatus embodying features of the invention which is shown in association with the top conveyor "felt" in Fig. 1, the conveyor interstices being exaggerated to show the effect of the curved axis rolls thereon;

Fig. 3 is an end elevation of the apparatus of Fig. 2, on the scale of Fig. 2, and showing the conveyor travelling to the apparatus and travelling from the apparatus into the wash region;

Figs. 6 and 7 are diagrammatic representations of a fragment of a woven "felt," showing the weft or filler elements perpendicular to the warp elements in Fig. 6, and showing a bowed condition of the weft or filler elements in Fig. 7;

Fig. 8 is a plan view of a fragment of a perforated sheet variety of paper making machine "felt";

Fig. 9 is a top plan view of a modification in which the end clamps for one of the curved axis rolls are adjustable on their supports for varying the tension on the travelling "felt" or other conveyor; and Fig. 10 is an end view of the apparatus of Fig. 9, with a portion of broken away.

Figure 1:
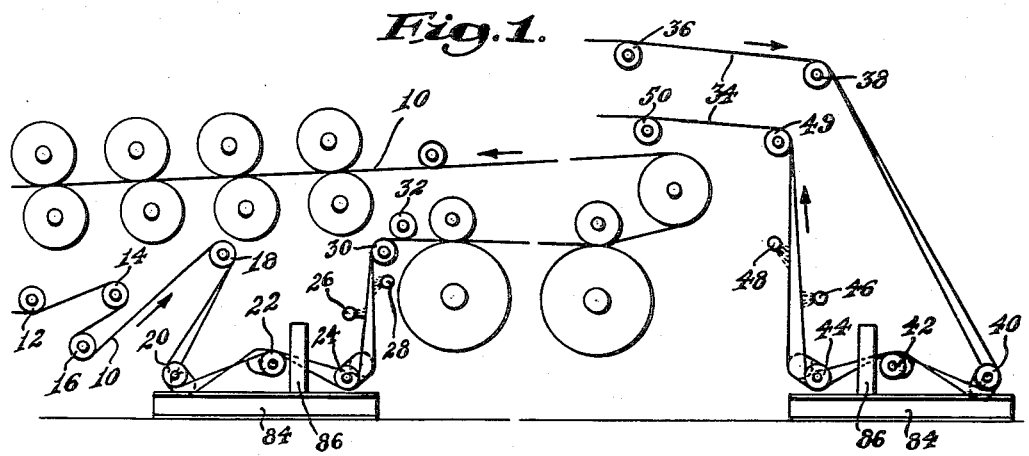
Fig. 1 is a diagrammatic representation of elements of a conventional paper-making machine with an apparatus embodying features of the invention diagrammatically represented in association with each of the top and bottom conveyor "felts" thereof.

Referring to the drawings, the invention is diagrammatically represented in Fig. 1 as it may be utilized in connection with a conventional paper-making machine whose bottom conveyor "felt" 10 travels in the direction of the arrows and is shown passing around the guide rolls 12, 14, 16 and 18 and thence downward from roll 18 to and around the first roll 20 of three curved axis rolls 20, 22, 24. The "felt" 10 engages around the under side of roll 20 and passes thence around the upper side of roll 22 and downward around the under side of the third curved axis roll 24, and then travels a substantially vertical course upward through a wash or spray region in which one side of the "felt" is sprayed by a water spray 26 and the other side is sprayed by a water spray 28. The "felt" passes from the spray region over guide roll 30 and under guide roll 32 on a course leading to the usual mechanism of the paper making machine.

The top "felt" 34 travels in the direction of the arrows associated therewith over the guide rolls 36, 38 and downward from roll 38 to and around the under side of the first roll 40 of a second set of curved axis rolls 40, 42, 44. The "felt" 34 passes from roll 40 to and over the upper side of roll 42 and thence downward around the under side of roll 44 and then substantially vertically upward through a second wash or spray region in which spray 46 sprays water on one side of the "felt" and spray 48 sprays on its other side. The "felt" 34 travels from the spray region over the guide rolls 49, 50 on a course leading back to elements of the paper-making machine which are not herein shown.

It will be understood that each of the "felts" 10 and 34 is a continuous belt type conveyor for supporting and conveying paper stock or pulp in the paper-making process as is well known in the art. The particular "felts" herein represented are of a conventional woven sheet type but it should be understood that the "felts" may be sheets of flexible plastic material or of other suitable sheet material, having perforations formed therein and provided with a suitably soft coating or covering at that side thereof which contacts the pulp or paper stock. A fragment of such a conveyor sheet is illustrated in Fig. 8.

According to the invention, however, the curved axis rolls 20, 22, 24 and 40, 42, 44 are introduced to act on the respective "felts" 10, 34 in a manner to loosen and dislodge masses and particles of paper stock or pulp and other foreign matter, which may have become lodged in the "felts," so that these masses and particles may be effectively and efficiently washed away from the "felts" by the water sprays 26, 28 and 46, 48. It is important to the efficiency and effectiveness of the "felts" 10, 34 that they be maintained relatively free of accumulations of foreign matter which tend to lodge in and on the "felts." The prior beating and whipping procedures for loosening foreign matter lodged in the "felts" have not been entirely satisfactory, and have substantially hastened deterioration of the "felts." Also, the prior "felts" become deleteriously affected if and when the weft or filler elements thereof become bowed, as frequently happens. Bowing of the weft or filler elements has the effect of reducing the size of the weave interstices through which suction can be effective on the conveyed material and this not only reduces the suction effect but the smaller interstices more readily become clogged with foreign matter lodging therein. Figs. 6 and 7 diagrammatically illustrate the interstices-reducing effect of bowing of the weft or filler elements of a woven "felt." Fig. 6 shows the weft or filler elements 10$^a$ in their proper perpendicular relation to the warp elements 10$^b$, while Fig. 7 shows the weft or filler elements 10$^a$ in a bowed condition which necessarily is accompanied by a substantial reduction in the width of the "felt," and a resulting crowding together of the warp elements 10$^b$. The interstices 10$^c$, in Fig. 7 are considerably reduced in size as compared with the wide-open interstices 10$^c$ in Fig. 6.

My present invention prevents bowing of the weft or filler elements of woven "felts" and relatively gently loosens and dislodges foreign matter from the "felts" without subjecting the "felts" to the deteriorating effects of prior beating and whipping procedures.

Each of the curved axis rolls 20, 22, 24, 40, 42, 44 may be of a type having a resiliently flexible sleeve of rubber or the like mounted for rotation about a curved axle. Inasmuch as these rolls become wet as a result of the water sprayed from the sprays 26, 28, 46, 48, each preferably has its ends sealed or substantially sealed against passage of water to the interior of the roll.

Figure 4:
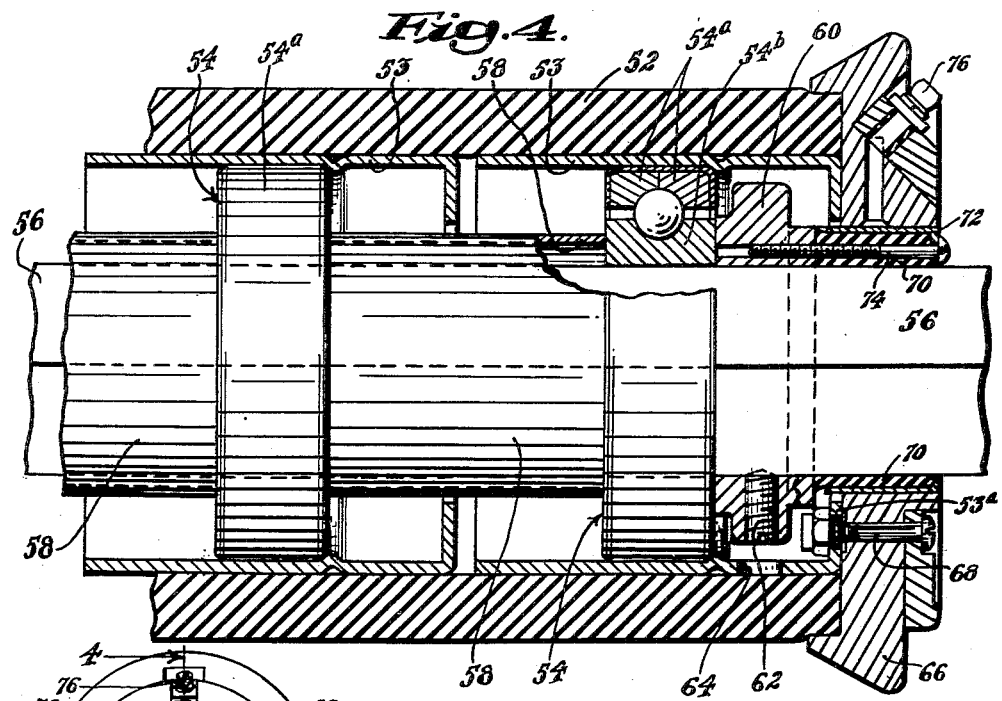
Fig. 4 is a cross-sectional view showing one sealed end portion of a curved axis roll of a type which may be employed in the apparatus of the invention, the section being on line 4—4 of Fig. 5 excepting that the section through the end collar is medially of one set screw.

Fig. 4 shows one end portion of a sealed or substantially sealed curved axis roll suitable for use in the apparatus of the invention, although it should be understood that the curved axis roll structure may be variously modified, and that various end-sealing means may be employed. The particular roll structure as illustrated in Fig. 4 has a resiliently flexible surface sleeve 52 of rubber, or the like, resiliently engaged over a series of roll sections or spools 53, each of which is mounted for rotation with the outer ball race 54$^a$ of a ball-bearing unit 54 whose inner race 54$^b$ is non-rotatably mounted on a longitudinally curved axle 56. Axle 56, as represented, has hexagonal cross-section, and the inner race 54$^b$ of each ball-bearing unit 54 has a hexagonal hole therein slightly larger than the axle whereby the ball-bearing units can be arranged on the axle and slid along the axle to any desired location but their inner races 54$^b$ are prevented from rotating on the axle. Cylindrical spacing elements 58 loosely surround the axle and each spacing element 58 engages between the inner races of adjacent ball-bearing units 54 to maintain the roll sections or spools 53 in slightly spaced relation throughout the length of the roll. All of the inner races 54$^b$ and spacing elements 58 are maintained under endwise compression by clamping collars 60, one at each end of the roll, each collar 60 being pressed against the outer side of the adjacent end-most inner race 54$^b$ and secured to axle 56 as by one or more set screws 62, which may be tightened by a screw-driver inserted through one or more holes 64 in the outermost roll section or spool 53 before the surface sleeve 52 is engaged over the roll sections or spools 53.

Figure 5:
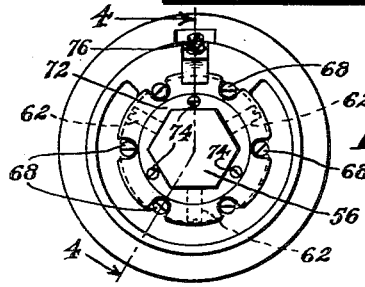
Fig. 5 is an end view of the roll of Fig. 4 on a smaller scale.

Each end seal for the roll of Fig. 4 includes a cap member 66 which engages over the adjacent end of the surface sleeve 52 and is secured, as by bolts 68 (Figs. 4, 5) to the inturned flange 53$^a$ of the adjacent end-most roll section or spool 53. A packing element 70 is engaged within the flanged member 72 and is compressed into sealing engagement around axle 56 by means of the screws 74 passing through the flange of member 72 and through the packing element 70 and screwed into the adjacent collar 60. The packing element 70 and flanged member 72 thus become secured, with collar 60, against rotation on axle 56 but cap member 66 rotates with the roll sections or spools 53 and surface sleeve 52. Lubrication of the bearing surfaces between cap member 66 and flanged member 72 may be effected through the grease fitting 76.

Inasmuch as rolls 20, 22, 24 act on the bottom "felt" 10 in the same manner that rolls 40, 42, 44 act on the top "felt" 34, this action is herein described in detail only in connection with rolls 40, 42, 44 and the illustration of the action of these rolls on the top "felt" 34, as shown in plan in Fig. 2. The top "felt" 34, travelling in the direction of the arrows, first engages around the under side of roll 40, passing thence around the upper side of roll 42, and then around the under side of roll 44.

It is a feature of the invention that curved axis roll 40 is mounted in end bearings 78 with its curved axis in a predetermined plane whereby roll 40 acts on "felt" 34 to expand or stretch the "felt" laterally as it passes around roll 40. In other words, roll 40 is mounted with its curved axis disposed in a plane whereby the "felt" 34 initially engages the roll at a concave portion thereof and leaves the roll at a convex portion thereof. Hence, roll 40 spreads and expands "felt" 34 laterally which has the effect of laterally opening the weave of the woven "felt." Curved axis roll 42 is mounted in end bearings 80 with its curved axis disposed in a plane whereby the laterally stretched "felt" 34 coming from roll 40 initially engages a roll 42 at a convex portion thereof and leaves roll 42 at a concave portion thereof. The result is that roll 42 acts on "felt" 34 to contract the "felt" laterally with a corresponding lateral closing of the weave. The third curved axis roll 44 of the set is mounted in end bearings 82 with its curved axis disposed in a plane whereby the contracted "felt" 34 coming from roll 42 initially engages roll 44 at a concave portion thereof and leaves roll 44 at a convex portion thereof which again expands and stretches the "felt" laterally prior to travel of the laterally stretched "felt" into the spray region where the sprays 46, 48 wash opposite sides of the "felt" while its weave is relatively open due to the final lateral stretching effect produced by roll 44. Preferably, this final lateral stretching at roll 44 is considerably greater than the lateral stretching at roll 40 although the relative amounts of lateral stretching effected at rolls 40, 44 is not of primary importance so long as the curved axis rolls effect lateral expansion of the "felt" followed by relaxing of the lateral tension, or actual lateral contraction of the "felt," and a subsequent substantial lateral expansion or stretching of the "felt" preliminarily to subjecting the expanded relatively open-weaved "felt" to the washing bath at the water sprays 46, 48.

It will be apparent that the described lateral opening and closing and opening of the "felt" weave as the "felt" advances toward the spray region works the woven elements of the "felt" laterally outward and inward and outward, and loosens and dislodges pulp masses and particles and other foreign matter which may be clogging the interstices of the woven "felt," or which may be otherwise deleteriously affecting the efficiency and effectiveness of the felt. The loosened and dislodged foreign matter, if remaining on the "felt" entering the spray region, becomes easily and effectively washed away by the spray water directed at the "felt" from opposite sides thereof and preferably, at vertically spaced locations in the spray region. The lateral expansions and contractions of the "felt" is gradual and gentle and imposes no hardship on the "felt" which is maintained relatively soft and clean for substantially longer periods of use than has been possible heretofore under the mentioned beating or whipping conditions which, heretofore, have caused the "felts" to deteriorate and lose their effectiveness in substantially shorter times than would be the case in the absence of the beating or whipping. Also, the herein described lateral expansion and contraction of the felt, combined with the wash sprays, more effectively and efficiently cleans the "felts" as compared with the prior procedures. Because the "felts" are maintained soft and open throughout substantially their entire useful lives, they can effectively handle the heavier pulp sheets throughout their periods of use. Heretofore, the "felts" have not been capable of effectively handling the heavier pulp sheets after the "felts" have been in use for relatively short periods, and it has been necessary to replace the used "felts" with new ones before the heavier pulp sheets could be efficiently handled. This, in considerable part, has been due to the tendency of the prior woven "felts" to contract substantially in width during use, with the previously mentioned bowing of the weft or filler elements and diminution of the size of the weave interstices. It has been necessary heretofore to purchase "felts" having extra width beyond the desired width in order to compensate for loss of width in use. The present invention delivers the "felts" so nearly in their initial condition that they can serve, throughout their useful lives, for efficiently handling both thin and relatively thick and heavy pulp sheets. Also, because of the wide open interstices and the more effective cleaning action by the apparatus of my invention, the "felts" may be operated at higher speeds than heretofore to increase the output of any particular machine. Other important advantages are that my improved apparatus permits substantial reduction in the longitudinal tension on the "felts" due to elimination of the need for "beating" or "whipping" the "felts," and my improved apparatus makes it feasible to purchase "felts" of less width for any particular job, as compared with prior practices.

Each axially curved roll may be adjusted in its end bearings to set its axis in any of a variety of planes, for varying its expanding or contracting effect on the engaged "felt." Also, any or all of the end bearings 78, 80, 82 may be vertically adjustable to permit raising or lowering of any or all of the curved axis rolls. In the herein disclosed embodiment, the end bearings 78, 82 are fixed in position on a support 84, and only the bearings 80 for the curved roll 42 are vertically adjustable on uprights 86 rising from support 84. Each upright may have a vertical slot therein, and each bearing 80 may have bolts 88 extending slidably through the slots with nuts 90 for clamping the bearings at any selected locations along the uprights 86.

Ordinarily, but not necessarily, the sprays 26, 28 and 46, 48 will be located and directed so that one spray in each wash region discharges a relatively high pressure spray through the "felt" for removing foreign matter from the remote paper-stock-carrying side of the "felt," and the other spray in each wash region may be a lower pressure spray discharged with downward inclination directly at the paper-stock-carrying side of the "felt." In Figs. 1 and 3, the sprays 26, 46 may be considered to be the relatively high pressure sprays.

Referring to Fig. 2, the diagrammatic representation of the weave of "felt" 34 exaggerates the weave to illustrate the effect of the curved rolls thereon. The projected dotted representation of the weave at A indicates the condition of the weave of the "felt" as it comes to roll 40, at which the "felt" becomes laterally expanded to open the weave as suggested at the weave portions B. Weave portions C illustrate lateral contraction of the weave as "felt" 34 comes to roll 42, and weave portions D show the weave being again laterally opened as the "felt" comes to roll 44. The projected dotted representation of the weave at E shows the relatively widely opened weave as the "felt" travels into the action of sprays 46, 48.

It will be obvious that the action of rolls 20, 22, 24 on "felt" 10 is the same as described for rolls 40, 42, 44.

Figs. 9 and 10 illustrate how one or more of the curved axis rolls of the invention may be adjustably mounted for serving as a take-up roll for taking up slack in a travelling "felt," or for varying tension therein. As shown, the roll 40 is mounted, in Figs. 9 and 10, for adjustment along the supporting members 84', it being understood that the roll 20 may be similarly mounted, if desired. Each member 84' is rectangular in cross-section and hollow, so that a relatively long screw 92 may be rotatably mounted on each member 84' with substantial extent into its hollow. The top wall of each member 84' has a relatively wide longitudinal slot 94 therein through which slidably extends a depending nut element 96 fixed on the adjacent roll-clamp 78', with the screw 92 threaded through the nut element, whereby rotation of the screw causes movement of the roll-clamp 78' along the supporting member 84' in either direction. Each end of the roll axle 56 is adjustably clamped in a different one of the roll-clamps 78' as described in connection with Figs. 1 and 3, and each clamp 78' may have securing bolts 98 extending through the relatively narrow slots 100 in the top wall of each supporting member 84' for securing the clamps in any selected positions of adjustment.

Each screw 92 is rotatably supported in suitable bearings 102, 104 of which bearing 104 is an end wall of member 84', and a bevel gear 106 is fixed on the outer end of each screw adjacent the end wall, each bevel gear 106 meshing with a different one of two similar bevel gears 108 fixed on a long shaft 110 extending transversely from one supporting member 84' to the other. Shaft 110 is mounted in bearings 112 on the end walls of members 84', and a hand wheel 114 on one end of shaft 110 facilitates manual rotations of shaft 110 and of screws 92. When an adjustment of the roll-clamps 78 is to be made, the bolts 98 will, of course, be loosened, and they will be tightened again, following an adjustment, to maintain the clamps in any selected positions.

Such an adjustable mounting of the roll-clamps of a curved roll 40 or 20, or both, enables the adjustable roll to serve as a take-up or tensioning roll, which eliminates the need for the customary one or more take-up rolls for acting on the "felt" or "felts" in paper making machines.

It is intended that the patent shall cover, by suitable expression in the appended claims, whatever features of patentable novelty exist in the invention disclosed.

I claim as my invention:

1. Apparatus for cleaning a travelling conveyor having interstices therein, comprising a plurality of conveyor-engaging members operative on the conveyor in succession at spaced locations along the path of travel of the conveyor, means supporting one of said members for engaging the conveyor in a manner to positively, gradually and progressively contract the conveyor laterally thereby to laterally close the said conveyor interstices, means supporting a next succeeding one of said members for engaging the conveyor in a manner to positively, gradually and progressively expand the conveyor laterally thereby to laterally open the said conveyor interstices, said gradual and progressive lateral closing and opening of the conveyor interstices in succession having the effect of loosening foreign matter lodged in the conveyor, and means for directing a wash spray on the conveyor subsequent to the said lateral expansion of the conveyor and while its interstices are in said laterally opened condition, thereby to wash said loosened foreign matter from the conveyor.

2. Apparatus for cleaning a travelling woven conveyor comprising a plurality of conveyor-engaging elements operative on the conveyor in succession at spaced locations along the path of travel of the conveyor, at least one of said elements being arranged and adapted to positively, gradually and progressively contract the conveyor laterally with a resulting lateral closing of interstices in the weave of the conveyor, and a next succeeding one of said elements being arranged and adapted to positively, gradually and progressively expand the conveyor laterally with a resulting lateral opening of interstices in the weave of the conveyor, and means for directing a wash spray on the conveyor subsequent to the said lateral expansion thereof and while the conveyor interstices are in said laterally opened condition.

3. Apparatus for prolonging the effective life of paper-making-machine conveyor "felts," and the like, having interstices therein, comprising longitudinally curved rolls disposed in spaced succession transversely of the direction of travel of a said conveyor "felt" with the conveyor "felt" engaging each curved roll and acted upon by the curved rolls in succession, one of said curved rolls being mounted and arranged with its longitudinally concave side in position to engage the "felt" and to reduce substantially the width thereof as the "felt" passes around said one of the rolls, whereby said interstices are appreciably reduced in size to squeeze out and loosen foreign matter which may have become lodged therein, and the next succeeding one of said curved rolls being mounted and arranged with its longitudinally convex side in position to engage the "felt" and to increase substantially the width thereof as compared with its width as reduced by the first mentioned one of said rolls, whereby said interstices are appreciably increased in size to further loosen foreign matter which may be clinging to said conveyor "felt," and means for directing wash sprays on the conveyor "felt" while said interstices have their said increased size thereby to wash away loosened foreign matter.

4. Apparatus for cleaning and prolonging the effective life of travelling conveyors having interstices therein, comprising a plurality of axially curved rolls disposed in spaced relation generally transversely across the direction of travel of a said conveyor with said conveyor having substantial engagement around each of the plurality of curved rolls in succession, adjustable means rigidly supporting the opposite ends of each of said curved rolls whereby the curved axis of each roll may be disposed in any of a variety of planes thereby to provide any of a variety of effects on the conveyor, one of said curved axis rolls being adjustably mounted and arranged with its longitudinally concave side in position to engage and act on the conveyor to reduce substantially the width thereof, and a next succeeding one of said rolls being adjustably mounted and arranged with its longitudinally convex side in position to engage and act on the conveyor to increase substantially the width thereof, whereby said interstices are forcibly closed to squeeze out and loosen foreign matter therein and then are forcibly opened to further loosen and dislodge said foreign matter in response to the said width-changing effects of the rolls on the conveyor.

5. Apparatus for cleaning lodged foreign matter from travelling conveyors having interstices therein, comprising three curved axis rolls disposed in spaced relation generally transversely across the direction of travel of the conveyor and arranged with said conveyor engaging under the first roll, over the second roll, and under the third roll in succession, said first and third rolls being mounted and arranged with their longitudinally convex sides in positions to engage and act on the conveyor to increase substantially the width thereof, and said second roll being mounted and arranged with its longitudinally concave side in position to engage and act on the conveyor to reduce substantially the width thereof, whereby said interstices are successively opened and closed and opened in response to said width-changing effects of said rolls on the conveyor, and spray means for directing wash water on the conveyor as it comes from said third roll and while the interstices are in their said opened condition.

6. Apparatus for de-clogging interstices of travelling woven conveyors whose interstices are subject to becoming clogged by foreign matter lodging therein, comprising a succession of curved axis rolls disposed transversely across the direction of travel of a said conveyor with each roll engaging and acting on the conveyor in a manner tending to positively and progressively change the width of the conveyor, alternate ones of said rolls being mounted and arranged with their longitudinally convex sides in positions to engage and act on the conveyor to increase substantially the width thereof, and another of said rolls which is located between said alternate rolls being mounted and arranged with its longitudinally concave side in position to engage and act on the conveyor to reduce substantially the width thereof, whereby said interstices are successively opened and closed and opened in response to said width-changing effects of the rolls on the conveyor, and means for manually adjusting the position of one of said curved axis rolls relative to the others whereby the longitudinal tension on the conveyor may be varied.

7. Apparatus for de-clogging interstices of travelling woven conveyors whose interstices are subject to becoming clogged by foreign matter lodging therein, comprising a succession of curved axis rolls disposed transversely across the direction of travel of a said conveyor with each roll engaging and acting on the conveyor in a manner tending to positively change the width of the conveyor, alternate ones of said rolls being mounted and arranged with their longitudinally convex sides in positions to engage and act on the conveyor to increase substantially the width thereof, and another of said rolls which is located between said alternate rolls being mounted and arranged with its longitudinally concave side in position to engage and act on the conveyor to reduce substantially the width thereof, whereby said interstices are successively opened and closed and opened in response to said width-changing effects of the rolls on the conveyor, and means for moving one of said curved axis rolls bodily relative to the next adjacent curved axis roll thereby to take up any slack in the conveyor.

8. Apparatus for de-clogging interstices of travelling woven conveyors whose interstices are subject to becoming clogged by foreign matter lodging therein comprising a succession of curved axis rolls disposed transversely across the direction of travel of a said conveyor with each roll engaging and acting on the conveyor in a manner tending to change the width of the conveyor, alternate ones of said rolls being mounted and arranged with their longitudinally convex sides in positions to engage and act on the conveyor to increase substantially the width thereof, and a said roll which is between said alternate rolls being mounted and arranged with its longitudinally concave side in position to engage and act on the conveyor to reduce substantially the width thereof, whereby said interstices are successively opened and closed and opened in response to said width-changing effects of said rolls on the conveyor.

References Cited in the file of this patent

UNITED STATES PATENTS

| | | | |
|---|---|---|---|
| 16,430 | Blake | Jan. 20, | 1857 |
| 1,501,721 | Peterson | July 15, | 1924 |
| 1,776,419 | Dodge | Sept. 23, | 1930 |
| 2,179,187 | Kendall | Nov. 7, | 1939 |
| 2,266,309 | Cohen | Dec. 16, | 1941 |
| 2,391,178 | McKnight | Dec. 18, | 1945 |
| 2,562,949 | Robertson | Aug. 7, | 1951 |
| 2,628,709 | Steinmetz | Feb. 17, | 1953 |

FOREIGN PATENTS

| | | | |
|---|---|---|---|
| 532,265 | Great Britain | Jan. 21, | 1941 |
| 655,213 | Great Britain | July 11, | 1951 |